United States Patent
Higuchi

(10) Patent No.: US 8,385,430 B2
(45) Date of Patent: Feb. 26, 2013

(54) VIDEO SIGNAL PROCESSING APPARATUS AND VIDEO SIGNAL PROCESSING METHOD

(75) Inventor: Shugo Higuchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 12/534,674

(22) Filed: Aug. 3, 2009

(65) Prior Publication Data

US 2010/0026904 A1    Feb. 4, 2010

(30) Foreign Application Priority Data

Aug. 4, 2008    (JP) ................................. 2008-200944

(51) Int. Cl.
   *H04N 7/12*    (2006.01)
(52) U.S. Cl. ................................. 375/240.26
(58) Field of Classification Search ............. 375/240.26; 348/497, 498, 499; 345/204; 382/238
   See application file for complete search history.

(56) References Cited

U.S. PATENT DOCUMENTS

| | | | |
|---|---|---|---|
| 7,098,959 B2 * | 8/2006 | Mishima et al. | 348/459 |
| 2004/0046891 A1 * | 3/2004 | Mishima et al. | 348/459 |
| 2004/0234143 A1 * | 11/2004 | Hagai et al. | 382/238 |
| 2006/0256238 A1 * | 11/2006 | Mishima et al. | 348/459 |
| 2008/0068359 A1 * | 3/2008 | Yoshida et al. | 345/204 |

FOREIGN PATENT DOCUMENTS

| | | |
|---|---|---|
| JP | 2004-159294 | 6/2004 |
| JP | 2006-184896 | 7/2006 |

\* cited by examiner

*Primary Examiner* — Sath V Perungavoor
*Assistant Examiner* — James Pontius
(74) *Attorney, Agent, or Firm* — Canon USA Inc. IP Division

(57) ABSTRACT

A moving area detecting circuit detects a moving area of image information S(i-1). An intermediate image generating circuit generates intermediate image information SC(i-1) based on the moving area information. A spatial frequency separating circuit generates high-frequency image information SH(i-1) and low-frequency image information SL(i-1) from the image information S(i-1). If contrast information of the moving area is higher than a predetermined value, an image represented by the image information S(i-1) and an image represented by the intermediate image information SC(i-1) are sequentially displayed. If the contrast information is not higher than the predetermined value, an image represented by the high-frequency image information SH(i-1) and an image represented by the low-frequency image information SL(i-1) are sequentially displayed.

13 Claims, 7 Drawing Sheets

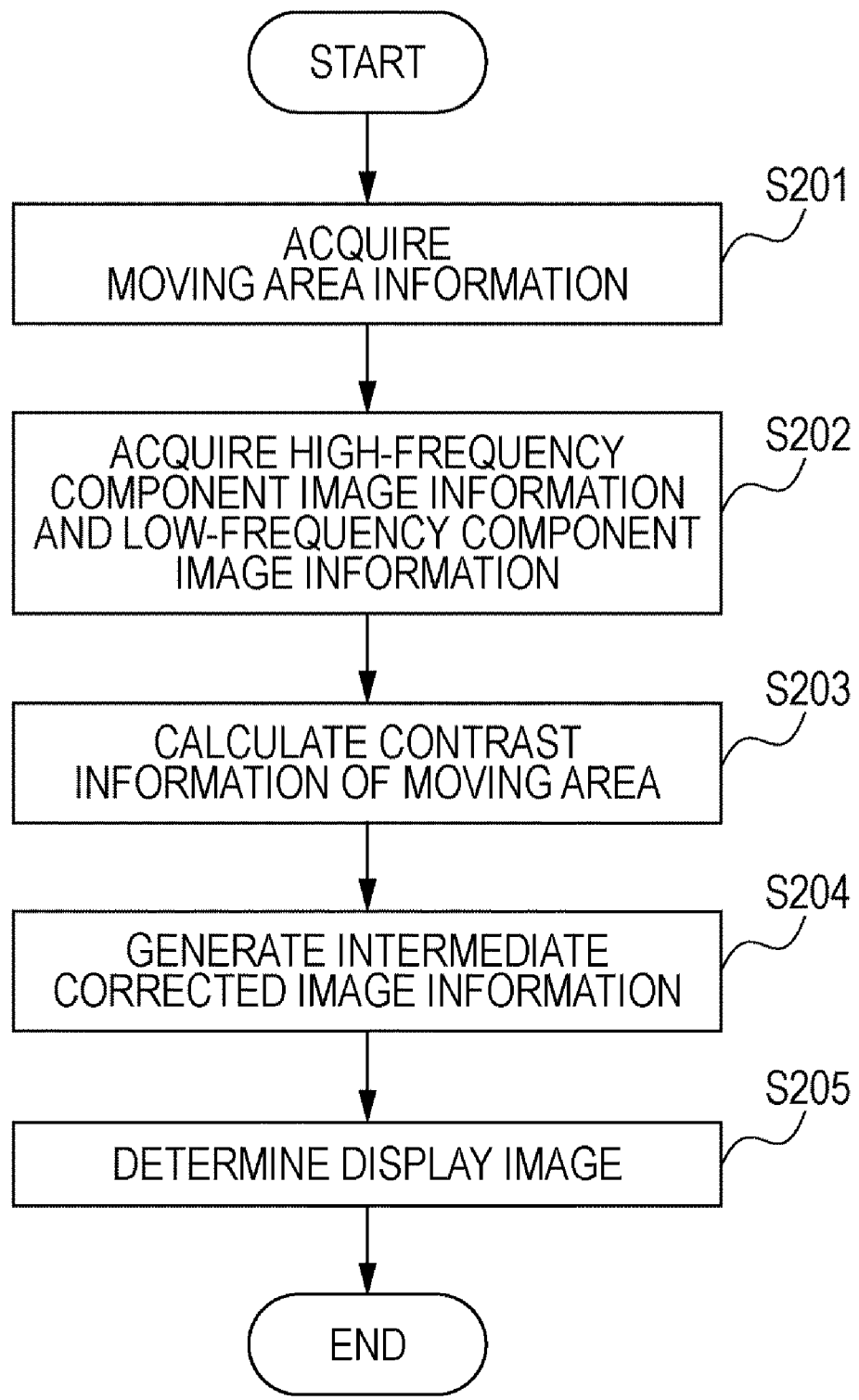

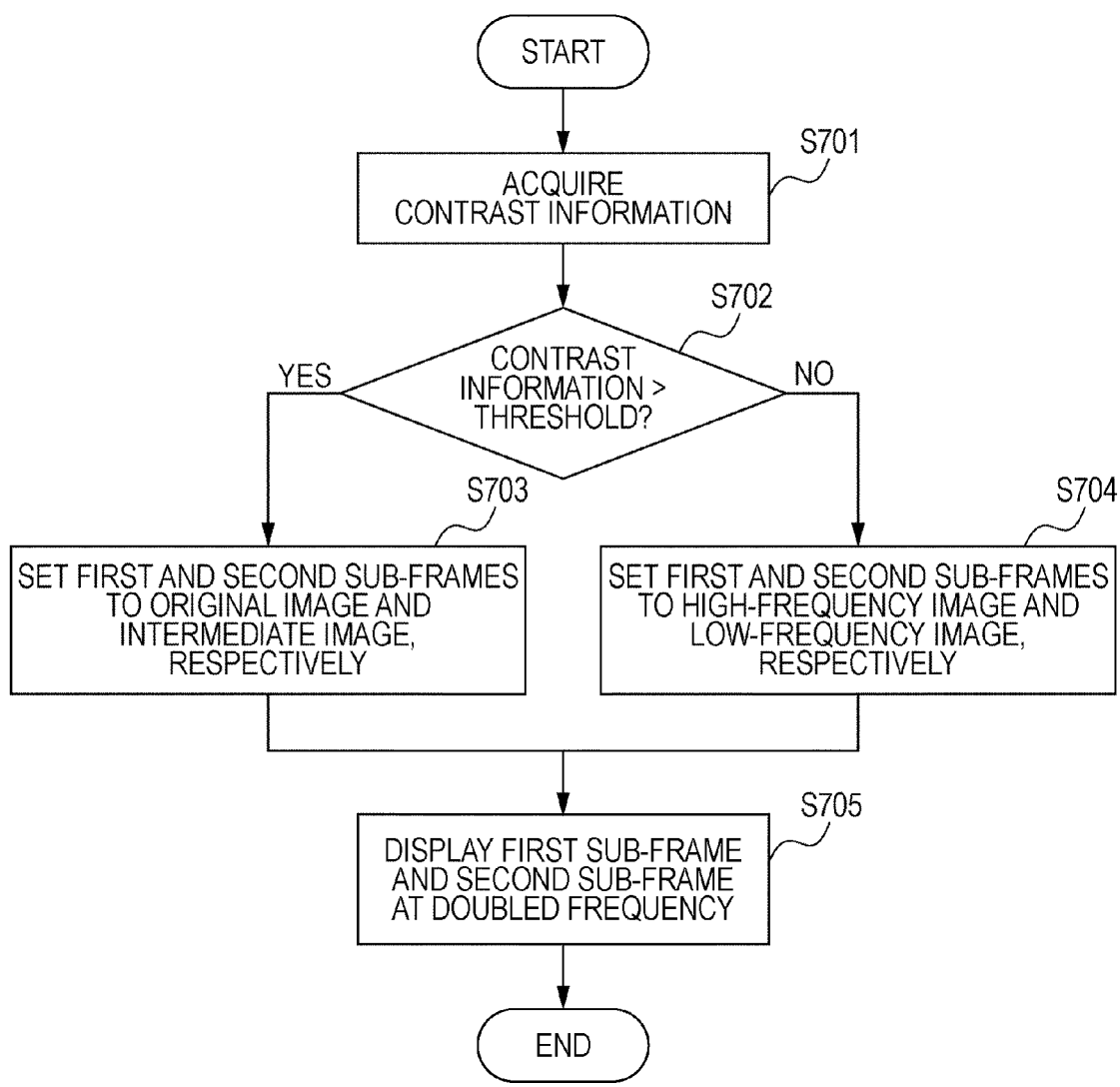

VIDEO SIGNAL PROCESSING APPARATUS AND VIDEO SIGNAL PROCESSING METHOD

BACKGROUND OF THE INVENTION

1. Field of the Invention

The present invention relates to a video signal processing apparatus for increasing a frame display frequency of an input video signal.

2. Description of the Related Art

Some display devices, such as television receivers, employ a double-speed driving method for increasing a frame display frequency (frame rate) to suppress flicker and blurring of motion. As the double-speed driving method, an intermediate image generating method for generating an intermediate corrected image by motion detection and a spatial frequency separating method for separating an image corresponding to an input video signal into a low-frequency component image and a high-frequency component image in a spatial frequency domain and displaying the low-frequency component image and the high-frequency component image are known.

The intermediate image generating method is for detecting motion of an object in an input video signal, and estimating and generating an image between two frames. Japanese Patent Laid-Open No. 2004-159294 discloses a method for generating an interpolation frame from a first reference frame and a second reference frame that follows the first reference frame.

In the spatial frequency separating method, filtering is executed on each frame of an input video signal to separate the input video signal into a spatial high-frequency component and a spatial low-frequency component. For example, the spatial high-frequency component is then collected in one sub-frame, whereas the spatial low-frequency component is distributed to both sub-frames. Sub-frames are frames displayed in the double-speed driving method. A plurality of sub-frames corresponds to one frame of the input video signal depending on a frame display frequency. Japanese Patent Laid-Open No. 2006-184896 discloses a method for reducing a high-frequency component of at least one sub-frame when one frame is divided into a plurality of sub-frames in accordance with an increase in a frame display frequency.

However, image quality may decrease by increasing the frame display frequency (frame rate) depending on video to be displayed.

More specifically, for example, if motion is incorrectly detected in the intermediate image generating method, an incorrect intermediate image is generated, which may result in image quality degradation.

In addition, for example, if neighboring pixels of an image of an input video signal has a large luminance value difference in the spatial frequency separating method, a contour or the like may remain in a low-frequency component image thereof. In such a case, jaggy is caused in reproduced images and image quality may decrease.

SUMMARY OF THE INVENTION

The present invention provides a technique for reducing image quality degradation that may be caused by an increase in a frame display frequency (frame rate).

According to an aspect of the present invention, a video signal processing apparatus for processing an input video signal includes a first generating unit configured to detect a moving area based on a first frame and a second frame of the input video signal and to generate a third frame that is an intermediate image to be displayed between the first frame and the second frame in accordance with information on the moving area, a second generating unit configured to generate a fourth frame and a fifth frame according to frequency components of the first frame, and a display control unit configured to sequentially display the first frame and the third frame in a case where contrast of the moving area is higher than a predetermined value, and to sequentially display the fourth frame and the fifth frame in a case where the contrast of the moving area is not higher than the predetermined value.

Further features of the present invention will become apparent from the following description of exemplary embodiments with reference to the attached drawings.

BRIEF DESCRIPTION OF THE DRAWINGS

FIG. 2 is a flowchart of processing executed by a video signal processing apparatus according to an exemplary embodiment of the present invention.

FIG. 7 is a flowchart of display image selecting processing.

DESCRIPTION OF THE EMBODIMENTS

Exemplary embodiments of the present invention will be described in detail below with reference to the accompanying drawings. Configurations shown in the following exemplary embodiments are only examples and the present invention should not be limited to the illustrated configurations.

In an exemplary embodiment, a description will be given for an example case of converting an input video signal, which is a non-interlace signal having a frame display frequency (frame rate) of 60 Hz, into a non-interlace signal of 120 Hz. More specifically, a video signal processing apparatus according to an exemplary embodiment executes processing for displaying moving images on a display device that displays 120 images per second regarding an input video signal for displaying 60 images per second. However, an exemplary embodiment of the present invention can be carried out if the input video signal is converted into other frame rates.

System Configuration

Figure 1:
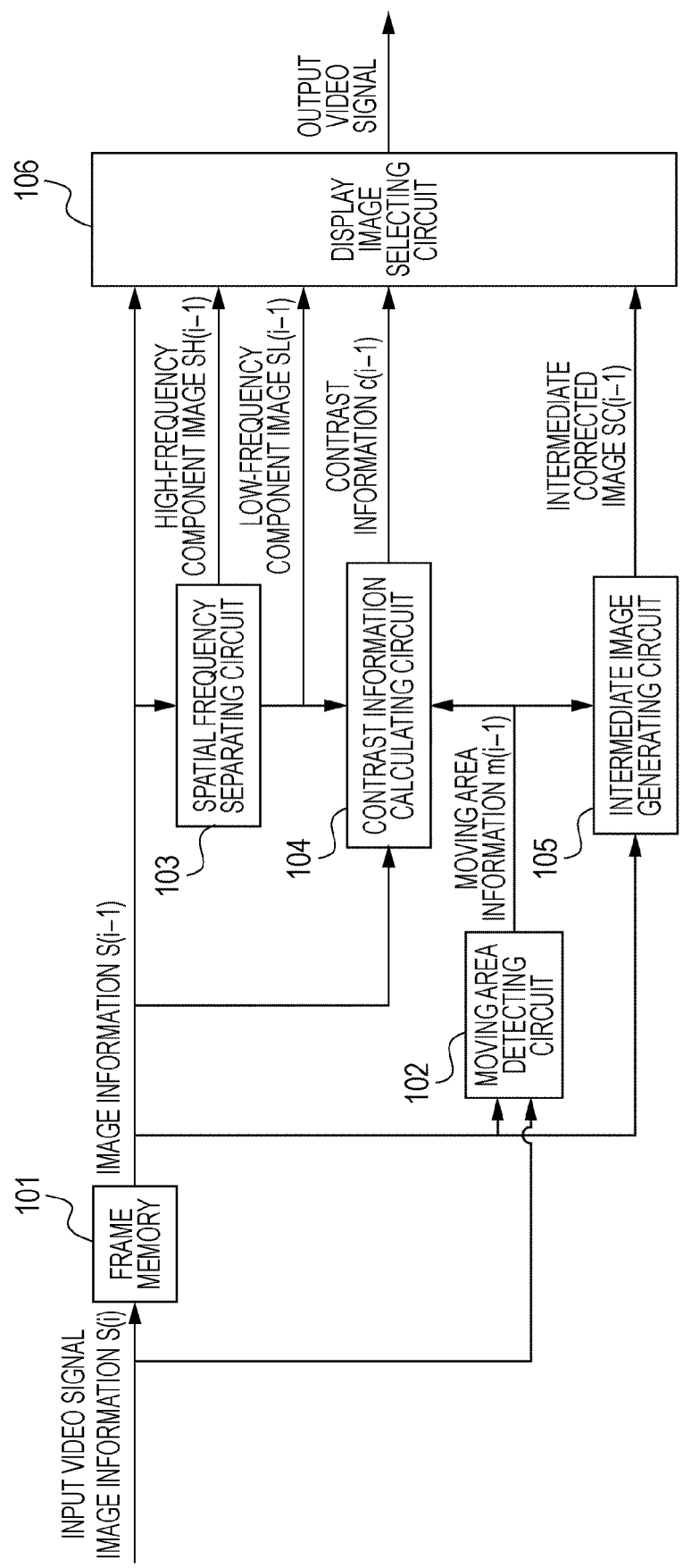
FIG. 1 is a block diagram showing an example of a configuration of a video signal processing apparatus according to an exemplary embodiment of the present invention.

FIG. 1 is a block diagram showing an example of a configuration of a video signal processing apparatus according to an exemplary embodiment of the present invention. Referring to FIG. 1, the video signal processing apparatus includes a frame memory 101, a moving area detecting circuit 102, a spatial frequency separating circuit 103, a contrast information calculating circuit 104, an intermediate image generating circuit 105, and a display image selecting circuit 106. The video signal processing apparatus according to the exemplary embodiment is for processing an input video signal. Additionally, the video signal processing apparatus may be an apparatus to be connected to a display device for displaying moving images or an apparatus embedded in a display device. More specifically, the video signal processing apparatus according to the exemplary embodiment may be an apparatus embedded in a display device for displaying moving images, such as a digital television, a personal computer (PC), a notebook PC, various home appliances including a computer, a video game machine, and a mobile phone. Additionally, the video signal processing apparatus may be an apparatus embedded in a video input apparatus for inputting moving image data to a display device, such as, for example, a digital camera and a digital video camera.

The frame memory 101 outputs image information S in response to input of an input video signal from a video input apparatus, not shown. More specifically, upon receiving image information S(i), e.g., image data of an image to be reproduced at time (i), as an input video signal, the frame memory 101 outputs image information S(i-1), which is image data of an image to be reproduced at time (i-1). That is, when moving images are displayed in accordance with a frame display frequency of the input video signal, the image information S(i-1) is image data of an image that is displayed immediately before an image represented by the image information S(i). The input video signal can be input from various video input apparatuses, such as a digital camera, a digital video camera, a server connected to a network, and a hard disk drive (HDD) for storing moving image data. The frame memory 101 outputs the image information S(i-1) to the moving area detecting circuit 102, the spatial frequency separating circuit 103, the contrast information calculating circuit 104, the intermediate image generating circuit 105, and the display image selecting circuit 106.

The moving area detecting circuit 102 detects a moving area in the image represented by the image information S(i-1) based on the image information S(i) input as the input video signal and the image information S(i-1) input from the frame memory 101, and acquires moving area information m(i-1). Accordingly, the moving area detecting circuit 102 detects a moving area of a first frame based on the first frame and a second frame of an input video signal. The moving area detecting circuit 102 outputs the acquired moving area information m(i-1) to the contrast information calculating circuit 104 and the intermediate image generating circuit 105. The moving area information m(i-1) includes coordinate information of moving areas of the image information S(i-1) and the image information S(i). A detail of the moving area information m(i-1) will be described later with reference to FIGS. 3A and 3B.

The spatial frequency separating circuit 103 generates high-frequency image information SH(i-1) and low-frequency image information SL(i-1) in response to input of the image information S(i-1) from the frame memory 101. The high-frequency image information SH(i-1) is image data of a high-frequency component image of the image represented by the image information S(i-1). The low-frequency image information SL(i-1) is image data of a low-frequency component image of the image represented by the image information S(i-1). The spatial frequency separating circuit 103 generates the high-frequency image information SH(i-1) and the low-frequency image information SL(i-1) of the image information S(i-1). That is, the spatial frequency separating circuit 103 generates images (a high-frequency component image and a low-frequency component image) in accordance with frequency components of the first frame. The spatial frequency separating circuit 103 outputs the high-frequency image information SH(i-1) to the display image selecting circuit 106. The special frequency separating circuit 103 outputs the low-frequency image information SL(i-1) to the display image selecting circuit 106 and the contrast information calculating circuit 104.

The spatial frequency separating circuit 103 may output an image obtained by combining the images resulting from the high-frequency image information SH(i-1) and the low-frequency image information SL(i-1). More specifically, the special frequency separating circuit 103 may output an image obtained by combining the low-frequency image information SL(i-1) and the weighted high-frequency image information SH(i-1), for example. Details of the high-frequency image information SH(i-1) and the low-frequency image information SL(i-1) will be described later.

The contrast information calculating circuit 104 receives the moving area information m(i-1), the image information S(i-1), and the low-frequency image information SL(i-1) from the moving area detecting circuit 102, the frame memory 101, and the spatial frequency separating circuit 103, respectively. The contrast information calculating circuit 104 calculates contrast information c(i-1) using the input pieces of information. The contrast information c(i-1) indicates a contrast level of the moving area of the image represented by the image information S(i-1). The contrast information calculating circuit 104 outputs the calculated contrast information c(i-1) to the display image selecting circuit 106. A method for calculating the contrast information c(i-1) executed by the contrast information calculating circuit 104 will be described later.

The intermediate image generating circuit 105 generates intermediate image information SC(i-1) based on the moving area information m(i-1) input from the moving area detecting circuit 102 and the image information S(i-1) input from the frame memory 101. More specifically, the intermediate image generating circuit 105 generates the intermediate image information SC(i-1) representing an intermediate image between an image represented by the image information S(i-1) and an image represented by the image information S(i) based on the moving area information m(i-1). That is, the intermediate image generating circuit 105 generates a third frame, which is an intermediate image between a first frame and a second frame, based on the moving area information. The intermediate image generating circuit 105 outputs the generated intermediate image information SC(i-1) to the display image selecting circuit 106. A method for generating the intermediate image information SC(i-1) executed by the intermediate image generating circuit 105 will be described later.

The display image selecting circuit 106 receives the image information S(i-1), the high-frequency image information SH(i-1), the low-frequency image information SL(i-1), the intermediate image information SC(i-1), and the contrast information c(i-1). The display image selecting circuit 106 outputs two pieces of image data selected from the image information S(i-1), the high-frequency image information SH(i-1), the low-frequency image information SL(i-1), and the intermediate image information SC(i-1) in accordance with these pieces of input information. More specifically, the display image selecting circuit 106 sequentially outputs a pair of the high-frequency image information SH(i-1) and the low-frequency image information SL(i-1) or a pair of the image information S(i-1) and the intermediate image information SC(i-1) to a display device, not shown, in accordance with the contrast information c(i-1). The display device sequentially displays images corresponding to the pieces of image data input from the display image selecting circuit 106.

Processing of System

A flow of processing executed by a video signal processing apparatus according to an exemplary embodiment will now be described with reference to FIG. 2 for an example case where image information S(i) is input as an input video signal.

FIG. 2 is a flowchart showing a flow of processing executed by the video signal processing apparatus. Although processing of each circuit to be described below is executed using hardware shown in FIG. 1 in this exemplary embodiment, the processing may be executed by software. More specifically, a central processing unit (CPU) for controlling the video signal processing apparatus may read out a control program stored in a read-only memory (ROM) or the like and may execute the processing.

At STEP S201, the moving area detecting circuit 102 detects a moving area of an image represented by image information S(i-1) based on the image information S(i-1) input from the frame memory 101 and the image information S(i) input as the input video signal. The moving area detecting circuit 102 acquires moving area information m(i-1) of the detected moving area. The moving area is detected based on a difference between the image information S(i) and the image information S(i-1). The moving area information m(i-1) includes coordinate information of a moving area of each image information S. As described above, when moving images are displayed in accordance with a frame display frequency of the input video signal, an image represented by the image information S(i) is displayed immediately after an image represented by the image information S(i-1).

Accordingly, at STEP S201, the moving area detecting circuit 102 detects a moving area of a first frame based on the first frame and a second frame of the input video signal. Here, the first frame corresponds to an image represented by the image information S(i-1), whereas the second frame corresponds to an image represented by the image information S(i). The moving area detecting circuit 102 then outputs the moving area information m(i-1) acquired at S201 to the contrast information calculating circuit 104 and the intermediate image generating circuit 105. A detail of the moving area information will be described later with reference to FIGS. 3A and 3B.

At STEP S202, the spatial frequency separating circuit 103 generates high-frequency image information SH(i-1) and low-frequency image information SL(i-1) from the image information S(i-1). The low-frequency image information SL(i-1) is image data obtained by applying a low-pass filter on the image information S(i-1). An image corresponding to this image data has a blurred contour compared to an image represented by the image information S(i-1). The high-frequency image information SH(i-1) is image data obtained by adding the image information S(i-1) to a difference between the image information S(i-1) and the low-frequency image information SL(i-1). An image corresponding to this image data has an enhanced contour compared to the image represented by the image information S(i-1).

Accordingly, at STEP S202, the spatial frequency separating circuit 103 generates a high-frequency component image and a low-frequency component image of a first frame. Here, the first and second frames correspond to the image information S(i-1) and S(i), respectively.

At STEP S202, the spatial frequency separating circuit 103 outputs the generated high-frequency image information SH(i-1) to the display image selecting circuit 106. At STEP S202, the spatial frequency separating circuit 103 also outputs the generated low-frequency image information SL(i-1) to the contrast information calculating circuit 104 and the display image selecting circuit 106. A detail of processing for generating spatial-frequency separated images executed by the spatial frequency separating circuit 103 will be described later. The processing at STEP S202 only has to be completed before the start of processing executed at STEP S205.

At STEP S203, the contrast information calculating circuit 104 calculates contrast information of the moving area. More specifically, the contrast information calculating circuit 104 calculates a difference between a moving area of the image information S(i-1) and a moving area of the low-frequency image information SL(i-1) based on the moving area information m(i-1). The contrast information calculating circuit 104 then calculates contrast information c(i-1) indicating a contrast level of the moving area in accordance with the calculated difference. The contrast information calculating circuit 104 receives the moving area information m(i-1) from the moving area detecting circuit 102 at STEP S201. The contrast information calculating circuit 104 outputs the calculated contrast information to the display image selecting circuit 106 at STEP S203. A detail of processing for calculating the contrast information will be described with reference to FIG. 5.

At STEP S204, the intermediate image generating circuit 105 generates intermediate image information SC(i-1) using the image information S(i) output from the frame memory 101 and the moving area information m(i-1) output from the moving area detecting circuit 102. As described above, the intermediate image information SC(i-1) is image data of an image to be displayed between an image represented by the image information S(i) and an image represented by the image information S(i-1).

Accordingly, at STEP S204, the intermediate image generating circuit 105 generates a third frame, which is an intermediate image between a first frame and a second frame, in accordance with the moving area information. Here, the first frame, the second frame, and the third frame correspond to the image represented by the image information S(i-1), the image represented by the image information S(i), and the image represented by the intermediate image information SC(i-1), respectively.

At STEP S204, the intermediate image generating circuit 105 outputs the generated intermediate image information SC(i-1) to the display image selecting circuit 106. A detail of processing for generating an intermediate corrected image will be described later with reference to FIGS. 6A-6C. The order of STEPs S203 and S204 may be switched.

At STEP S205, the display image selecting circuit 106 selects image data to be output to a display device. The display image selecting circuit 106 outputs the image data to the display apparatus so that images are displayed at a frame display frequency (frame rate) that is higher than that of the input video signal. As described above, a description is given in this exemplary embodiment for a case of sequentially displaying a first sub-frame and a second sub-frame acquired from one or two pieces of image data of the input video signal to display images at a double frame display frequency of the input video signal. However, the images may be displayed at other frame display frequencies. The display image selecting circuit 106 is supplied with the image information S(i-1), the high-frequency image information SH(i-1), the low-frequency image information SL(i-1), the intermediate image information SC(i-1), and the contrast information c(i-1). At STEP S205, the display image selecting circuit 106 determines whether the contrast information c(i-1) is higher than a predetermined value.

If the display image selecting circuit 106 determines that the contrast information c(i-1) of the moving area of the image information S(i-1) is higher than the predetermined value, the display image selecting circuit 106 selects the original image information S(i-1) and the intermediate image information SC(i-1) as the first sub-frame and the second sub-frame, respectively. The display image selecting circuit

106 then outputs the selected pieces of image data to a display device. Here, a sub-frame is a frame to be displayed in double-speed driving. A plurality of sub-frames corresponds to one frame of the input video signal depending on a frame display frequency. In this exemplary embodiment, it is assumed that the frame display frequency of the input video signal is 60 Hz, whereas the frame display frequency of the display device is 120 Hz. Accordingly, two sub-frames correspond to the image information S(i-1). Herein, a sub-frame to be displayed first of the two sub-frames is referred to as the first sub-frame, whereas a sub-frame to be displayed next is referred to as the second sub-frame. When the contrast of the moving area of the first frame is higher than the predetermined value, the display image selecting circuit 106 sequentially outputs the first frame and the third frame as the first sub-frame and the second sub-frame, respectively, at STEP S205. That is, when it is determined that the contrast information c(i-1) of the moving area of the image information S(i-1) is higher than the predetermined value, the display image selecting circuit 106 sequentially outputs an image represented by the image information S(i-1) and an image represented by the intermediate image information SC(i-1).

On the other hand, if it is determined that the contrast information c(i-1) is not higher than the predetermined value, the display image selecting circuit 106 outputs the high-frequency image information SH(i-1) and the low-frequency image information SL(i-1) as the first sub-frame and the second sub-frame, respectively, at STEP S205. More specifically, when the contrast of the moving area of the first frame is not higher than the predetermined value, the display image selecting circuit 106 allows a display device to sequentially display a high-frequency component image of the first frame and a low-frequency component image of the first frame at STEP S205. That is, when it is determined that the contrast information of the moving area of the image information S(i-1) is not higher than the predetermined value, the display image selecting circuit 106 sequentially allows the display device to display an image represented by the high-frequency image information SH(i-1) and an image represented by the low-frequency image information SL(i-1).

The images to be sequentially displayed when the contrast information of the moving area is not higher than the predetermined value are not limited to the images represented by the high-frequency image information SH(i-1) and the low-frequency image information SL(i-1). More specifically, when the contrast information of the moving area is not higher than the predetermined value, the display image selecting circuit 106 may display the following images. The display image selecting circuit 106 may display, for example, an image (fourth frame) corresponding to a combination of the low-frequency image information SL(i-1) and the double-weighted high-frequency image information SH(i-1) as the first sub-frame. Additionally, the display image selecting circuit 106 may display an image (fifth frame) of the low-frequency image information SL(i-1) as the second sub-frame. In this manner, if the contrast information of the moving area is not higher than the predetermined value, the display image selecting circuit 106 sequentially outputs frames according to frequency components of the first frame (i.e., the image information S(i-1)).

As described above, the contrast information c(i-1) indicates a contrast level of the moving area of the image information S(i-1). A display device, not shown, supplied with the pieces of image data by the display image selecting circuit 106 sequentially displays images corresponding to the supplied pieces of image data.

The display image selecting circuit 106 switches between pieces of image data to be output to a display device in accordance with the contrast information c(i-1) in this manner because of the following reasons. More specifically, when the contrast of the moving area is high, the moving area is more likely to be accurately detected. If the moving area is accurately detected, an intermediate image generated by the detection is effective as an image to be displayed between images corresponding to the input video signal. On the other hand, when the contrast of the moving area is high, edges often remain in a low-frequency component image. When a high-frequency component image and a low-frequency component image are sequentially displayed in such a case, jaggy of the images is more likely to be caused due to overlapping images.

In contrast, when the contrast of the moving area is low, the moving area is more likely to be mistakenly detected. If the moving area is mistakenly detected, an intermediate image generated by the detection is more likely to deviate from an image that should be displayed between images of the input video signal. On the other hand, when the contrast of the moving area is low, images are more likely to be smoothly reproduced by sequentially displaying the high-frequency component image and the low-frequency component image. Accordingly, the display image selecting circuit 106 according to this exemplary embodiment switches between pieces of image data to be output to the display device in accordance with the contrast information of the moving area output from the contrast information calculating circuit 104. A detail of processing for selecting display images executed by the display image selecting circuit 106 will be described later with reference to FIG. 7.

Processing for Calculating Moving Area Information

Figure 3B:
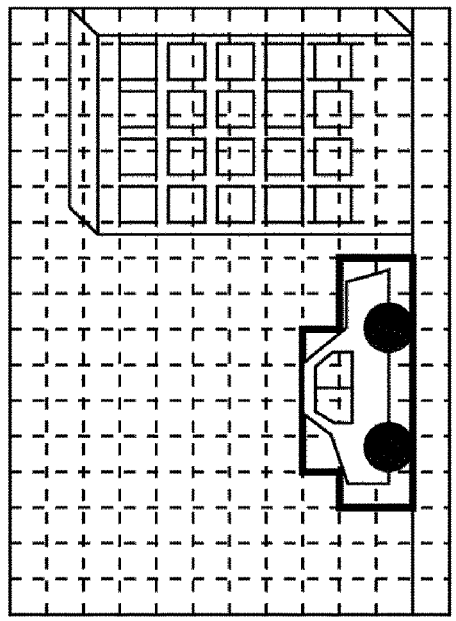
FIGS. 3A and 3B are conceptual diagrams for describing calculation of moving area information.
Figure 3A:
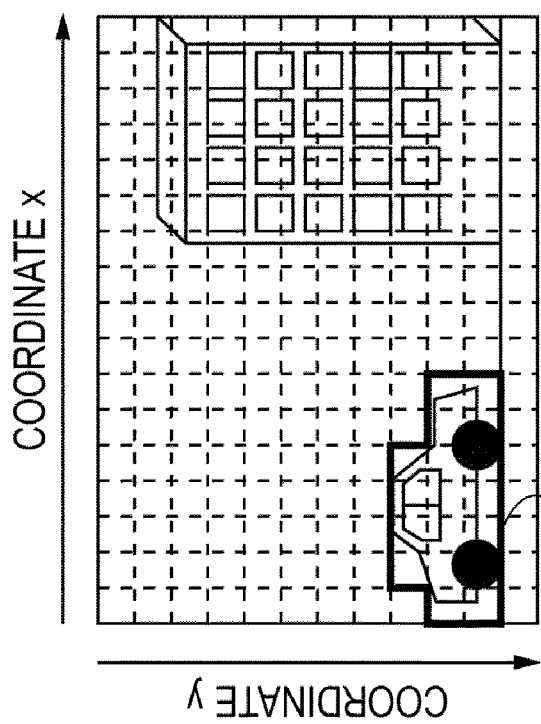

Processing for detecting a moving area and processing for calculating moving area information executed by the moving area detecting circuit 102 according to this exemplary embodiment will now be described with reference to FIGS. 3A and 3B. This processing corresponds to the processing executed at STEP S201 of FIG. 2. FIGS. 3A and 3B are conceptual diagrams for describing processing for calculating moving area information. More specifically, FIG. 3A shows image information S(i-1), whereas FIG. 3B shows image information S(i). As described above, when moving images are displayed in accordance with a frame display frequency of an input video signal, the image information S(i-1) corresponds to image data of an image that is reproduced immediately before an image represented by the image information S(i). The moving area detecting circuit 102 divides each of the images into a plurality of pixel blocks (broken lines) and detects a moving area in the image represented by the image information S(i-1) through pattern matching of the pixel blocks. More specifically, the moving area detecting circuit 102 compares a pixel block shown in FIG. 3A with each pixel block shown in FIG. 3B to determine a pixel block having a high correlation. The moving area detecting circuit 102 executes the comparison with each pixel block shown in FIG. 3B for all of the pixel blocks shown in FIG. 3A. The moving area detecting circuit 102 then detects, as a moving area, a pixel block (or pixel blocks) that has a high correlation but is displayed at different positions in FIGS. 3A and 3B. Here, it is assumed that pixel blocks (enclosed by a solid line) shown in FIG. 3A is detected. In addition, a moving area of the image information S(i) corresponding to the moving area of the image information S(i-1) is detected as shown by a solid line in FIG. 3B. At this time, the moving area information m(i-1) includes a coordinate value of each vertex of the moving area of the image information S(i-1) and the image information S(i). Since the detected moving area has eight vertexes in the example shown in FIGS. 3A and 3B, the moving area information m(i-1) includes 16 coordinate values. That is, the moving area information m(i-1) has coordinate information of eight vertexes of the moving area detected from the image information S(i-1) and coordinate information of eight vertexes of the moving area detected from the image information S(i). The moving area detecting circuit 102 detects the moving area in this manner and outputs the moving area information m(i-1) to the contrast information calculating circuit 104 and the intermediate image generating circuit 105.

For example, a circuit that is used in a Y/C separating circuit of a television receiver or a scanning line conversion circuit for converting the interlace into the non-interlace may be used as the moving area detecting circuit 102.

Processing for Generating Spatial-Frequency Separated Images

Figure 4A:
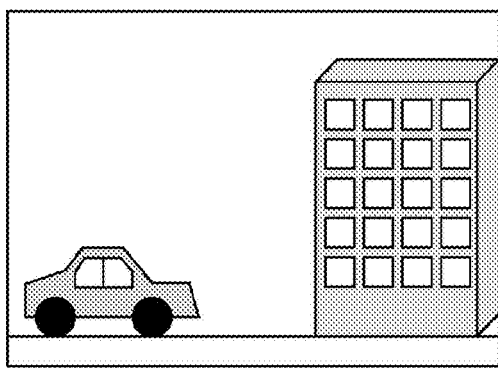
FIGS. 4A-4C are conceptual diagrams for describing generation of spatial-frequency separated images.
Figure 4B:
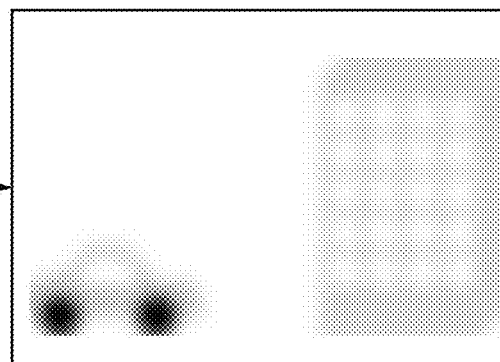
Figure 4C:
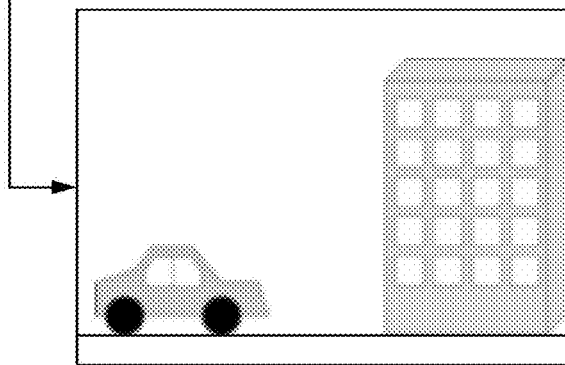

Processing for generating spatial-frequency separated images executed by the spatial frequency separating circuit 103 according to this exemplary embodiment will now be described with reference to FIGS. 4A-4C. This processing corresponds to the processing executed at STEP S202 of FIG. 2. FIGS. 4A-4C are conceptual diagrams for describing processing for generating spatial-frequency separated images.

FIG. 4A shows image information S(i-1), whereas FIGS. 4B and 4C show low-frequency image information SL(i-1) of the image information S(i-1) and high-frequency image information SH(i-1) of the image information S(i-1), respectively. The low-frequency image information SL(i-1) is generated by applying a low-pass filter on the image information S(i-1). The high-frequency image information SH(i-1) is generated by calculating a difference between the image information S(i-1) and the low-frequency image information SL(i-1) and adding the difference to the image information S(i-1). As shown in FIGS. 4A-4C, an image represented by the low-frequency image information SL(i-1) has a blurred contour compared to an image represented by the image information S(i-1). An image represented by the high-frequency image information SH(i-1) has an enhanced contour compared to the image represented by the image information S(i-1). A parameter of the low-pass filter used by the spatial frequency separating circuit 103 may be previously determined or may be set by a user.

Processing for Calculating Contrast Information

Figure 5:
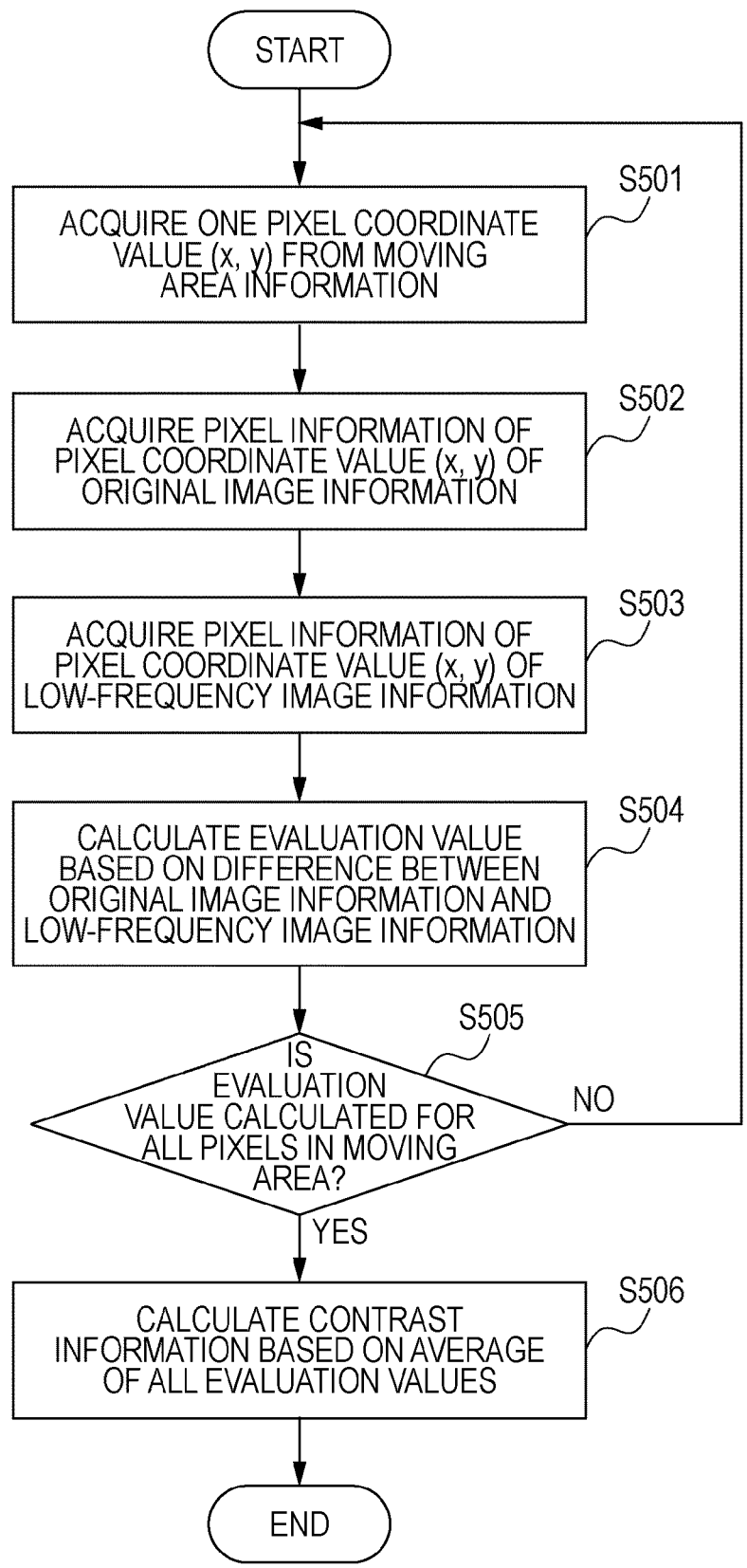
FIG. 5 is a flowchart of processing for calculating contrast information.

Processing for calculating contrast information executed by the contrast information calculating circuit 104 according to this exemplary embodiment will now be described with reference to FIG. 5. This processing corresponds to the processing executed at STEP S203 of FIG. 2. FIG. 5 is a flowchart showing a procedure of processing for calculating contrast information.

At STEP S501, the contrast information calculating circuit 104 acquires one coordinate value (x, y) in a moving area based on the moving area information m(i-1) acquired at STEP S201.

At STEP S502, the contrast information calculating circuit 104 acquires pixel information of the image information S(i-1) for the coordinate value (x, y) acquired at STEP S501. The acquired pixel information is, for example, a luminance signal value Y or an RGB value. When moving images are displayed in accordance with a frame display frequency of an input video signal, the image information S(i-1) is original image information displayed at time (i-1).

At STEP S503, the contrast information calculating circuit 104 acquires pixel information of the low-frequency image information SL(i-1) for the coordinate value (x, y) acquired at STEP S501. The acquired pixel information is, for example, a luminance signal value Y or an RGB value. The low-frequency image information SL(i-1) is image data of a low-frequency component image of an image represented by the image information S(i-1).

At STEP S504, the contrast information calculating circuit 104 calculates an evaluation value based on a difference between the coordinate value (x, y) of the original image information S(i-1) and the coordinate value (x, y) of the low-frequency image information SL(i-1). The evaluation value is, for example, an absolute value of a difference between luminance of the original image and the low-frequency component image.

At STEP S505, the contrast information calculating circuit 104 determines whether the evaluation value is calculated for all of pixels in the moving area. If the evaluation value is calculated for all pixels, the process proceeds to STEP S506. Otherwise, the process returns to STEP S501 and the above-described processing is repeated.

At STEP S506, the contrast information calculating circuit 104 calculates contrast information based on the evaluation values of all pixels in the moving area. It is assumed that the contrast information is an average of the evaluation values of all pixels, for example.

In this manner, the contrast information calculating circuit 104 according to this exemplary embodiment calculates the contrast information of the moving area using a difference between the image information S(i-1) representing an original image and the low-frequency image information SL(i-1), which is image data of a low-frequency component image thereof. More specifically, contrast of a moving area of a first frame is acquired based on a difference between the moving area of the first frame and a moving area of a low-frequency component image of the first frame. Here, the first frame corresponds to an image represented by the image information S(i-1). Since the contrast information is calculated using the low-frequency component image information generated at STEP S202 in this manner, the contrast information can be calculated with a small processing load.

As a general contrast information calculating method, there is a method for calculating the contrast information using a difference between a luminance value of a high-luminance area and a luminance value of a low-luminance area in a moving area. The contrast information determined in this manner may be utilized as information for selecting images to be displayed as first and second sub-frames.

However, as described above, the contrast information calculating circuit 104 according to this exemplary embodiment calculates the contrast information using a difference between the image information S(i-1) representing the original image and the low-frequency image information SL(i-1), which is the image data of the low-frequency component image. In this manner, it is possible to avoid a difference between values of pixels located at a distance from being reflected in the contrast information to be calculated. More specifically, when the contrast information is calculated based on a luminance difference between a high-luminance area and a low-luminance area in a moving area and the high-luminance area and the low-luminance area are located apart from one another, the contrast information indicating high contrast may be calculated if the luminance difference therebetween is large. Accordingly, even if the contrast information indicating high contrast is calculated, an intermediate corrected image may be generated based on an incorrectly detected moving area. In contrast, as in this exemplary embodiment, if the contrast information is calculated based on a difference between the image information S(i-1) of the original image and the low-frequency image information SL(i-1), it is possible to avoid the difference between values of pixels located apart from being reflected in the contrast information. Accordingly, the display image selecting circuit 106 can accurately evaluate whether the intermediate corrected image is generated based on the incorrectly detected moving area using the contrast information calculated in this exemplary embodiment.

As another contrast information calculating method, there is a method for calculating the contrast information based on a difference between pixel values of neighboring pixel blocks in a moving area of an original image, for example. More specifically, for example, a luminance value of each pixel block in a moving area is compared with a luminance value of a neighboring pixel block. A part having the smallest difference is calculated as a contrast evaluation value. If the minimum luminance difference value between the neighboring pixel blocks is large, the contrast information indicating high contrast is calculated. The contrast information determined in this manner may be utilized as information for selecting images to be displayed as first and second sub-frames. However, the contrast information calculating circuit 104 according to this exemplary embodiment calculates the contrast information using a difference between the image information S(i-1) of the original image and the low-frequency image information SL(i-1) that is image data of a low-frequency component image thereof. In this manner, a processing amount of contrast information calculation can be reduced compared to, for example, a case of determining the contrast information after calculating a difference between each pixel block of the moving area and neighboring pixel blocks located in four directions.

Processing for Generating Intermediate Corrected Image

Processing for generating intermediate image information executed by the intermediate image generating circuit 105 according to this exemplary embodiment will now be described with reference to FIGS. 6A-6C. This processing corresponds to the processing executed at STEP S204 of FIG. 2.

Figure 6C:
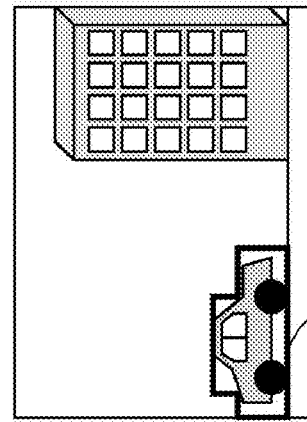
FIGS. 6A-6C are conceptual diagrams for describing generation of an intermediate corrected image.
Figure 6B:
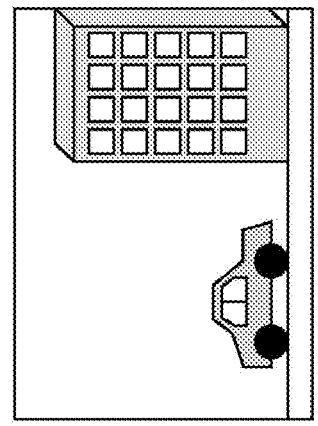
Figure 6A:
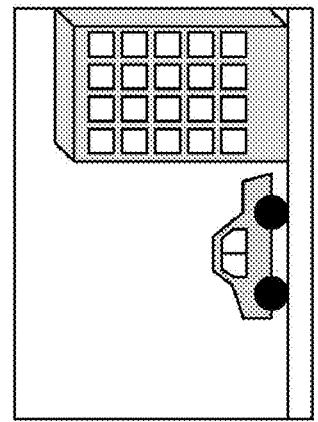

FIGS. 6A-6C are conceptual diagrams for describing processing for generating an intermediate corrected image. More specifically, FIG. 6A shows an image represented by image information S(i-1), whereas FIGS. 6B and 6C show images represented by intermediate image information SC(i-1) and an image represented by image information S(i), respectively. The intermediate image generating circuit 105 calculates a motion vector based on moving area information m(i-1) and estimates an image between the image information S(i) and the image information S(i-1) to generate the intermediate image information SC(i-1). As described above, the moving area information m(i-1) includes coordinate information of moving areas detected from the image information S(i-1) and the image information S(i). The intermediate image generating circuit 105 determines, for example, a motion vector of the moving area from the coordinate information of the moving area of each piece of the image information S and moves the moving area to a position indicated by a half of a quantity of the motion vector, thereby generating the intermediate corrected image.

More specifically, the intermediate image generating circuit 105 determines a direction of movement of a moving area between the image represented by image information S(i-1) and the image represented by the image information S(i) and a quantity of the movement based on the coordinate information of the moving areas. The intermediate image generating circuit 105 generates the intermediate image information SC(i-1) representing an image obtained by moving the moving area of the image represented by the image information S(i-1) in the determined direction by a distance equal to a half of the determined quantity. As described above, when a frame display frequency of an input video signal is increased, the intermediate image information SC(i-1) is image data for displaying an image between the image represented by the image information S(i-1) and the image represented by the image information S(i). The coordinate information of the moving area of each piece of the image information S is stored in association with each other. More specifically, when the moving area detecting circuit 102 detects a plurality of moving areas at STEP S201, the moving area information m(i-1) that associates the coordinate information of each moving area of the image information S(i-1) with the coordinate information of respective moving area of the image information S(i) is acquired. When a plurality of moving areas are detected, the intermediate image generating circuit 105 can determine, for each of the moving areas, the direction and quantity of the movement and generate the intermediate image information SC(i-1) representing an image obtained by moving each of the plurality of moving areas based on the determined values.

Processing for Selecting Display Images

Processing for selecting display images executed by the display image selecting circuit 106 according to this exemplary embodiment will now be described with reference to FIG. 7. This processing corresponds to the processing executed at STEP S205 of FIG. 2.

FIG. 7 is a flowchart showing a procedure of processing for selecting display images executed by the display image selecting circuit 106.

At STEP S701, the display image selecting circuit 106 acquires contrast information c(i-1) calculated at STEP S203. As described above, the contrast information c(i-1) indicates a contrast level of a moving area of an image represented by image information S(i-1).

At STEP S702, the display image selecting circuit 106 determines whether the contrast information c(i-1) exceeds a threshold. If the contrast information c(i-1) exceeds the threshold, the process proceeds to STEP S703. Otherwise, the process proceeds to STEP S704. The threshold of the contrast information may be previously set or may be changed by a user.

At STEP S703, the display image selecting circuit 106 selects the original image information S(i-1) and the intermediate image information SC(i-1) as a first sub-frame and a second sub-frame, respectively. More specifically, the display image selecting circuit 106 outputs image data to a display device so that an image represented by the image information S(i-1) and an image represented by the intermediate image information SC(i-1) are displayed at time (i-1) and at time between time (i-1) and time (i), respectively.

At STEP S704, the display image selecting circuit 106 selects the high-frequency image information SH(i-1) and the low-frequency image information SL(i-1) as the first sub-frame and the second sub-frame, respectively. More specifically, the display image selecting circuit 106 outputs image data to a display device so that an image represented by the high-frequency image information SH(i-1) and an image represented by the low-frequency image information SL(i-1) are displayed at time (i-1) and at time between time (i-1) and time (i), respectively.

At STEP S705, the display image selecting circuit 106 sequentially displays the first sub-frame and the second sub-frame so that the frame rate of the input video signal is doubled.

More specifically, if it is determined that contrast of a moving area of a first frame is higher than a predetermined value at STEP S702, the display image selecting circuit 106 sequentially selects the first frame and a third frame at STEP S703. On the other hand, if it is determined that the contrast of the moving area of the first frame is not higher than the predetermined value at STEP S702, the display image selecting circuit 106 sequentially selects a high-frequency component image of the first frame and a low-frequency component image of the first frame at STEP S704. In this embodiment, the first frame and the third frame indicate the image represented by the image information S(i-1) and the image represented by the intermediate image information SC(i-1), respectively. Additionally, in this exemplary embodiment, the high-frequency component image of the first frame and the low-frequency component image of the first frame indicate the image represented by the high-frequency image information SH(i-1) and the image represented by the low-frequency image information SL(i-1), respectively.

The threshold used in the determination executed at STEP S702 may be dynamically changed in accordance with the size of the detected moving area and the speed of movement. More specifically, for example, when the detected moving area is large, viewers are more likely to feel jaggy of the displayed low-frequency component image compared to a case where the moving area is small. Accordingly, when the moving area is large, the display image selecting circuit 106 may lower the threshold to be compared with the contrast information at STEP S702 so that the intermediate corrected image is more likely to be selected as the display image. That is, when the moving area of the image information S(i-1) (first frame) is larger than a predetermined size, the display image selecting circuit 106 sets a smaller value for the predetermined value compared to a case where the moving area is not larger than the predetermined size. The display image selecting circuit 106 dynamically changes the threshold to be compared with the contrast information in accordance with the size of the moving area, whereby image quality degradation caused by an increase in a frame display frequency can be reduced.

When the moving speed of the detected moving area is high, i.e., when corresponding moving areas of the image represented by the image information S(i-1) and the image represented by the image information S(i) are apart from one another, viewers are more likely to feel jaggy of the displayed low-frequency component image compared to a case where the moving speed is not high. Accordingly, when the moving speed of the moving area is high, the display image selecting circuit 106 lowers the threshold to be compared with the contrast information at STEP S702 so that the intermediate corrected image is more likely to be selected as the display image. More specifically, when a distance between a first position indicating a position of the moving area of the image information S(i-1) and a second position indicating a position of the moving area of the image information S(i) corresponding to the moving area of the image information S(i-1) is larger than a predetermined distance, the display image selecting circuit 106 executes the following processing. The display image selecting circuit 106 sets a lower threshold used in the comparison with the contrast information compared to a case where the distance on a display screen is not larger than the predetermined distance. As described above, the image information S(i) (second frame) is image data of an image to be displayed immediately after the image represented by the image information S(i-1) (first frame). If the display image selecting circuit 106 dynamically changes the threshold to be compared with the contrast information in accordance with the moving speed of the moving area, image quality degradation due to an increase in a frame display frequency can be reduced.

When the moving area detecting circuit 102 detects a plurality of moving areas, the contrast information calculating circuit 104 calculates contrast information of a predetermined number of moving areas from one having the largest moving area of the detected moving areas. The display image selecting circuit 106 selects images to be displayed in accordance with a result of comparison of the contrast information of the contrast-information calculated moving areas with the threshold. For example, if there is contrast information that is not higher than the threshold as a result of the comparison of the contrast information of the plurality of moving area with the threshold, the display image selecting circuit 106 displays a high-frequency component image and a low-frequency component image. In this manner, a chance of displaying images including a mistakenly detected major object on a display screen can be reduced.

For example, the contrast information calculating circuit 104 may calculate the contrast information of moving areas having a size that is equal to or larger than a predetermined size among the plurality of detected moving areas. At STEP S702, the plurality of pieces of contrast information is compared with the threshold. If there is contrast information that is equal to or lower than the threshold as a result of the comparison, the display image selecting circuit 106 may display a high-frequency component image and a low-frequency component image. In this manner, a chance of displaying images including a mistakenly detected major object on a display screen can be reduced. When the contrast information of a plurality of moving areas is compared with the threshold, the threshold to be compared may be changed in accordance with the size or moving speed of each of the moving areas.

As described above, the moving area detecting circuit 102 of a video signal processing apparatus according to an exemplary embodiment detects a moving area of image information S(i-1) based on the image information S(i-1) and image information S(i) of an input video signal. The intermediate image generating circuit 105 generates intermediate image information SC(i-1) that is image data of an intermediate image to be displayed between an image represented by the image information S(i-1) and an image represented by the image information S(i) in accordance with information on the moving area. The spatial frequency separating circuit 103 generates a high-frequency component image and a low-frequency component image of the image information S(i-1). If it is determined that contrast of the moving area of the image information S(i-1) is higher than a predetermined value, the display image selecting circuit 106 sequentially displays an image represented by the image information S(i-1) and an image represented by the intermediate image information SC(i-1). If it is determined that the contrast of the moving area of the image information S(i-1) is not higher than the predetermined value, the display image selecting circuit 106 sequentially displays an image represented by the high-frequency image information SH(i-1) and an image represented by the low-frequency image information SL(i-1) of the image information S(i-1).

In this manner, image quality degradation due to an increase in a frame display frequency can be reduced.

Although the description has been given for a case of processing the image information S(i-1) and the image information S(i) of pieces of image information contained in an input video signal in this exemplary embodiment, the processing can be executed similarly on other pieces of image information.

Additionally, the processing described in this exemplary embodiment may be executed on each frame or on every some frames. If the processing is executed at predetermined intervals, a processing load according to the exemplary embodiment of the present invention can be reduced.

Although the description has been given for a case where the display image selecting circuit 106 according to this exemplary embodiment displays an image represented by the high-frequency image information SH(i-1) and an image represented by the low-frequency image information SL(i-1) if the contrast information of the moving area is not higher than the predetermined value, the images to be displayed are not limited to this particular example. More specifically, if the contrast information of the moving area is not higher than the predetermined value, the display image selecting circuit 106 may display the following images, for example. The display image selecting circuit 106 may display, as a first sub-frame, an image (fourth frame) according to a combination of the low-frequency image information SL(i-1) and the double-weighted high-frequency image information SH(i-1). In addition, the display image selecting circuit 106 may display, as a second sub-frame, an image (fifth frame) of the low-frequency image information SL(i-1). If the contrast information of the moving area is not higher than the predetermined value, the display image selecting circuit 106 sequentially displays frames according to frequency components of the first frame (image information S(i-1)).

The functions of the present invention are also achieved by the following embodiments. More specifically, a recording medium storing program codes of software for realizing the above-described functions of the exemplary embodiments is supplied to a system or an apparatus. A computer (or a CPU or an MPU) of the system or the apparatus reads out and executes the program codes stored on the recording medium. In this case, since the program codes read out from the recording medium realize the above-described functions of the exemplary embodiments, the recording medium storing the program codes constitutes the present invention.

The recording medium for supplying the program codes may be, for example, a flexible disk, a hard disk, an optical disk such as a CD-ROM, a CD-R, and a DVD, a magneto-optical disk, a magnetic tape, a nonvolatile memory card, and a ROM.

The present invention is not limited to an embodiment for realizing the above-described functions of the exemplary embodiments by executing the program codes read out by the computer. More specifically, an operating system (OS) operating on the computer executes part of or all of actual processing based on instructions of the program codes, thereby realizing the above-described functions of the exemplary embodiments. The present invention also includes such a case.

Furthermore, the present invention includes the following embodiment. More specifically, the program codes read out from the recording medium are written in a memory included in a function expansion board inserted into a computer or a function expansion unit connected to the computer. A CPU or the like included in the function expansion board or the function expansion unit executes part of or all of actual processing based on instructions of the program codes, thereby realizing the above-described functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-200944 filed on Aug. 4, 2008, which is hereby incorporated by reference herein in its entirety.

What is claimed is:

1. A video signal processing apparatus for processing an input video signal, comprising:
    a first generator configured to detect a moving area based on a first frame and a second frame of the input video signal and to generate a third frame that is an intermediate image to be displayed between the first frame and the second frame in accordance with information on the moving area;
    a second generator configured to generate a fourth frame and a fifth frame according to frequency components of the first frame; and
    a display controller configured to sequentially display the first frame and the third frame in a case where contrast of the moving area is higher than a predetermined value, and to sequentially display the fourth frame and the fifth frame in a case where the contrast of the moving area is not higher than the predetermined value.

2. The apparatus according to claim 1, wherein the contrast of the moving area is acquired based on a difference between a moving area of the first frame and a corresponding moving area of a low-frequency component image of the first frame.

3. The apparatus according to claim 1, wherein, in a case where the moving area of the first frame is larger than a predetermined size, the display controller sets, as the predetermined value, a value that is lower than a value employed in a case where the moving area is not larger than the predetermined size.

4. The apparatus according to claim 1, wherein, in a case where a distance between a first position indicating a position of the moving area of the first frame and a second position indicating a position of the moving area of the second frame to be displayed after the first frame that corresponds to the moving area of the first frame is larger than a predetermined distance on a display screen, the display controller sets, as the predetermined value, a value that is lower than a value employed in a case where the distance on the display screen is not larger than the predetermined distance.

5. The apparatus according to claim 1, wherein, in a case where contrast of a first moving area having a size larger than a predetermined size among the first moving area and a second moving area detected from the first frame and the second frame is higher than the predetermined value, the display controller sequentially displays the first frame and the third frame, whereas, in a case where the contrast of the first moving area is not higher than the predetermined value, the display controller sequentially displays the fourth frame and the fifth frame.

6. The apparatus according to claim 1, wherein, in a case where contrast of at least one of a plurality of moving areas that are detected from the first frame and the second frame and have the size larger than a predetermined size is not higher than the predetermined value, the display controller sequentially displays the fourth frame and the fifth frame.

7. A video signal processing method executed by a video signal processing apparatus for processing an input video signal, the video signal processing method comprising:
    detecting a moving area based on a first frame and a second frame of the input video signal and generating a third frame that is an intermediate image to be displayed between the first frame and the second frame in accordance with information on the moving area;

generating a fourth frame and a fifth frame according to frequency components of the first frame; and sequentially displaying the first frame and the third frame in a case where contrast of the moving area is higher than a predetermined value, and sequentially displaying the fourth frame and the fifth frame in a case where the contrast of the moving area is not higher than the predetermined value.

8. The method according to claim 7, wherein the contrast of the moving area is acquired based on a difference between a moving area of the first frame and a corresponding moving area of a low-frequency component image of the first frame.

9. The method according to claim 7, wherein, in a case where the moving area of the first frame is larger than a predetermined size, a value that is lower than a value employed in a case where the moving area is not larger than the predetermined size is set as the predetermined value.

10. The method according to claim 7, wherein, in a case where a distance between a first position indicating a position of the moving area of the first frame and a second position indicating a position of the moving area of the second frame to be displayed after the first frame that corresponds to the moving area of the first frame is larger than a predetermined distance on a display screen, a value that is lower than a value employed in a case where the distance on the display screen is not larger than the predetermined distance is set as the predetermined value.

11. The method according to claim 7, wherein, in a case where contrast of a first moving area having a size larger than a predetermined size among the first moving area and a second moving area detected from the first frame and the second frame is higher than the predetermined value, the first frame and the third frame are sequentially displayed, whereas, in a case where the contrast of the first moving area is not higher than the predetermined value, the fourth frame and the fifth frame are sequentially displayed.

12. The method according to claim 7, wherein, in a case where contrast of at least one of a plurality of moving areas that are detected from the first frame and the second frame and have the size larger than a predetermined size is not higher than the predetermined value, the fourth frame and the fifth frame are sequentially displayed.

13. A non-transitory computer-readable storage medium storing a program for processing an input video signal, the program comprising:

computer-executable instructions for detecting a moving area based on a first frame and a second frame of the input video signal and generating a third frame that is an intermediate image to be displayed between the first frame and the second frame in accordance with information on the moving area;

computer-executable instructions for generating a fourth frame and a fifth frame according to frequency components of the first frame; and computer-executable instructions for sequentially displaying the first frame and the third frame in a case where contrast of the moving area is higher than a predetermined value, and sequentially displaying the fourth frame and the fifth frame in a case where the contrast of the moving area is not higher than the predetermined value.

* * * * *